United States Patent
Grivna

(10) Patent No.: US 6,377,587 B1
(45) Date of Patent: Apr. 23, 2002

(54) DATA PACKET FORMAT AND HANDLING FOR SERIAL COMMUNICATIONS WITH EMBEDDED REVERSE CHANNEL RESPONSES

(75) Inventor: Edward L. Grivna, Brooklyn Park, MN (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 08/774,136

(22) Filed: Dec. 26, 1996

(51) Int. Cl.[7] ............................... H04J 3/16; H04J 3/12
(52) U.S. Cl. ....................................... 370/474; 370/528
(58) Field of Search ................................ 370/474, 346, 370/449, 433, 435, 461, 522, 475, 235, 412, 528, 462; 371/32; 340/825.5, 825.51

(56) References Cited

U.S. PATENT DOCUMENTS

| | | | | |
|---|---|---|---|---|
| 4,429,387 A | * | 1/1984 | Kaminski | 370/522 |
| 4,542,380 A | * | 9/1985 | Beckner et al. | 340/825.5 |
| 4,642,630 A | * | 2/1987 | Beckner et al. | 340/825.5 |
| 4,779,269 A | * | 10/1988 | Bouillot et al. | 370/522 |
| 4,813,040 A | * | 3/1989 | Futato | 370/528 |
| 4,914,650 A | * | 4/1990 | Sriram | 370/235 |
| 5,343,473 A | * | 8/1994 | Cidon et al. | 370/465 |
| 5,703,875 A | * | 12/1997 | Burnett | 370/381 |
| 5,940,405 A | * | 7/1999 | Sakuma | 370/468 |
| 6,052,390 A | * | 4/2000 | Deliot et al. | 370/528 |
| 6,108,346 A | * | 8/2000 | Doucette et al. | 370/450 |

* cited by examiner

*Primary Examiner*—Wellington Chin
*Assistant Examiner*—Kevin C. Harper
(74) *Attorney, Agent, or Firm*—Christopher P. Maiorana, P.C.

(57) ABSTRACT

Commands are embedded in data packets of packet characters by inserting at least one command character at an arbitrary place within the data packet among the packet characters. The command characters include at least one distinct differentiation character which is defined to be different from any of the packet characters. The distinct differentiation character allows the command characters to be recognized as command characters rather than packet characters so that the received command may be extracted from the packet characters and the original data packet can be reassembled without the command characters.

32 Claims, 6 Drawing Sheets

DATA PACKET FORMAT AND HANDLING FOR SERIAL COMMUNICATIONS WITH EMBEDDED REVERSE CHANNEL RESPONSES

BACKGROUND OF THE INVENTION

The present invention relates to the field of digital communications and, in particular, to the bi-directional movement of error-free data.

It is common in digital systems to require significant quantities of data to be moved from one location to another. Devices and methods that focus primarily on this task are often referred to as data movers. Computer interfaces like parallel ports, serial ports, and modems are all forms of data movers. Other examples of parts of systems that fall under this umbrella are back-planes, busses and network interfaces.

Many data transmissions are in the form of packets of data, which, in addition to data characters, may include other characters such as cyclic redundancy code (CRC) characters and framing characters. In many cases, to provide an error-free link, each received packet is checked for errors and the status of the packet is reported back to the transmitter. If an error is found the packet is retransmitted. If no confirmation of receipt is received, the packet is retransmitted. For example, if an acknowledge command (ACK) is received by the device in which a packet originated, this indicates that the packet was received correctly; and if a negative acknowledge command (NAK) is received by the device in which a packet originated, this indicates there was an error. Similarly, if no response is received by the device in which a packet originated, this also indicates there was an error.

Assuming a bi-directional flow of data packets, it is desirable to make these status messages and/or status commands coexist with the data packets. Typically, these status messages are packaged in their own packets and transmitted between data packets. In addition, other link-control commands are transmitted this way.

This method of combining data and commands requires trade-offs between link latency (how long before status is expected to be received) and link overhead (how much non-data must be sent).

For example, after an error is discovered at a remote node, the remote node cannot notify the local node until any packet the remote node is sending is complete. This may cause substantial delay due to the fact that long packets are preferred because they improve throughput. The longer the packet, however, the longer the delay.

SUMMARY OF THE INVENTION

The present invention concerns a method of transmitting and receiving both data packets and commands as a sequence of characters. These sequences are used to overcome at least some of the above-noted problems. The method includes the steps of transmitting and receiving the contents of a data packet as a sequence of consecutive characters. The method also includes the steps of transmitting and receiving commands as a sequence of consecutive characters. The method may include the step of inserting from zero-to-N commands (N being a positive integer) into the transmission of each data packet, and may further include the step of separating commands and data packets from a received sequence of characters.

In further embodiments, the present invention concerns the definition of a character set used for transmission and reception of data packets and commands. The character set may be composed of characters used to represent all possible data characters. The character set may also be composed of one or more additional characters, the additional characters being distinguishable from all characters used to represent data characters, with these additional characters referred to hereafter as differentiation characters.

In further embodiments, the present invention concerns the definition of one or more commands composed of at least one differentiation character and from zero-to N (N being a positive integer) additional data or differentiation characters. To allow the command to be received, the number of characters in each command may be fixed as part of the definition of the command. Alternatively, the number of characters in the command may be specified by a data character contained within the command. In a preferred embodiment, each command is a single character in length to keep overhead to a minimum.

In further embodiments, the invention concerns the steps of defining the data packets as consisting of from one-to-N (N being a positive integer) data characters. The data packets may also include additional data characters containing validation information based on the contents of the data packet. The data packet may be bounded by at least one differentiation character and from zero-to-N (N being a positive integer) additional data or differentiation characters.

The present invention further includes the process of sequentially transmitting characters of a data packet, the transmission continuing until either all characters of the packet have been sent, or until a command is ready to be sent. When a command is ready, the transmission of data packet characters is suspended at a character boundary, and the sequence of characters comprising the command may be transmitted in its entirety. Following the transmission of the command, transmission of the remaining characters, if any, of the data packet may be resumed.

The present invention also concerns a preferred method for receiving data packets and commands which overcomes at least some of the above-noted problems. The method includes the steps of receiving a sequence of characters, and of separating that sequence into data packets and commands.

In further embodiments, the present invention concerns the further steps of receiving data packet characters until a differentiation character is received. The differentiation character and from zero-to-N (N being a positive integer) additional data or differentiation characters are then decoded to determine the presence of either an embedded command or the end of the data packet. If the differentiation character marks the presence of an embedded command, the command may be extracted from the sequence of received characters and, following this extraction, reception of data packet characters may be enabled. If the differentiation character and from zero-to-N (N being a positive integer) additional data and/or differentiation characters marks the end of the data packet, the data packet may then be completed and the validation characters may then be used to validate the contents of the received data packet.

BRIEF DESCRIPTION OF THE DRAWINGS

These and further features of the present invention will be apparent with reference to the following description and drawings, wherein.

DETAILED DESCRIPTION OF PREFERRED EMBODIMENTS EMBEDDED COMMAND PROTOCOL

Figure 1:
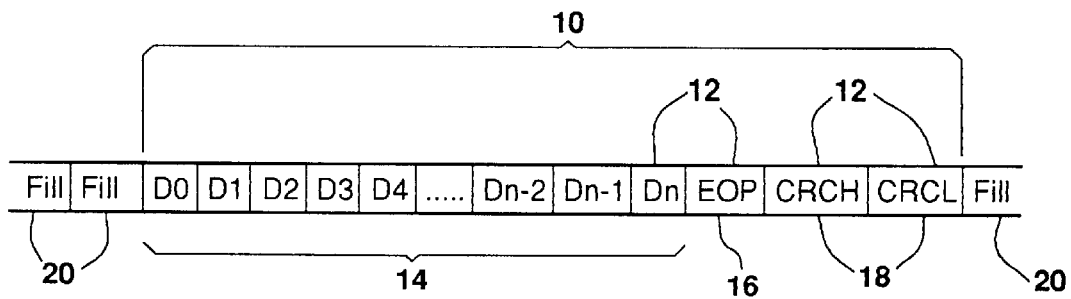
FIG. 1 an exemplary diagram of a default data packet.

FIG. 1 illustrates a grouping of data typically called a data packet 10 which is formed to transmit data bytes across a serial communications link. The data packet 10 is made up of a sequence of packet characters 12. Preferably, two types of characters are transferred across the link: data characters which carry data or other information based on the individual bits used to make up each character, and differentiation characters which indicate commands not based on the individual bits used to make each character. Preferably, the bit groupings used to send these two different types of characters should be non-overlapping (i.e., the intersection of the two sets of bit-groupings is zero).

Each data packet 10 typically includes a data field 14 and other overhead characters such as packet framing characters 16, cyclic redundancy code (CRC) characters (also known as validation characters) 18, and/or any other desirable characters such as, for example, Fill or SYNC characters 20.

The data field 14 includes data characters which represent data bytes intended to be transmitted across the link. The data bytes, for example, can be converted into 10-bit code words, these code words are characters used to transmit the data bytes. The illustrated data field 14 has a quantity of n data characters (D0 through $D_n$, n being an integer).

The packet framing characters 16 typically frame the data field 14 to indicate the beginning and/or end of the data packet 10. For example, the illustrated data packet 10 includes the end-of packet (EOP) located directly after the data field 14. The EOP is transmitted to inform the receiver that there are no more data characters in the data field 14 and the CRC characters 18 can be checked to validate the data packet 10. The packet framing characters 16 are typically differentiation characters.

The CRC characters 18 are typically appended to the end of the data packet 10. For example, the illustrated data packet 10 includes two CRC characters 18, CRCH and CRCL, located directly after the EOP packet framing character 16. The CRC characters 18 are typically data characters 14 and are used by the receiver to validate error free transmission of the data characters of the data field 14, as described in more detail hereafter.

While the Fill characters 20 can be inserted anywhere within the data packet 10, the Fill characters 20 are preferably present only between data packets 10. It is noted that fill characters 20 are not necessary within the data packet 10 when the data packet has a variable length as described in more detail hereafter. The Fill characters 20 can be inserted between data packets 10 and preferably a minimum of two fill characters 20 are inserted between data packets to ensure framing. Typically, however, there will be more than the minimum due to the link turnaround time for the response. The Fill characters are typically differentiation characters.

Figure 2:
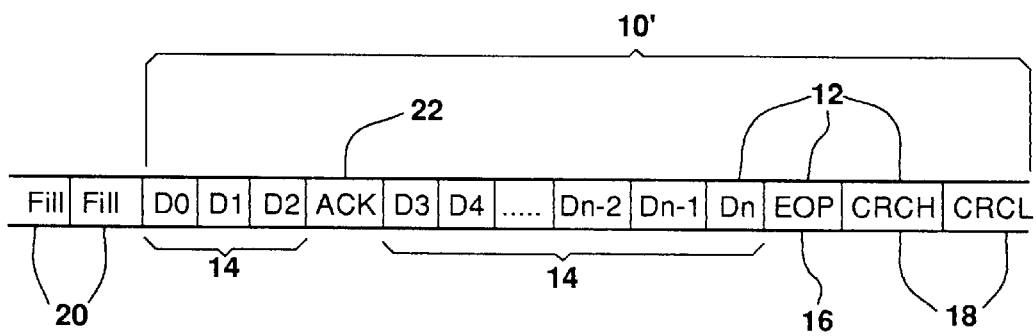
FIG. 2 an exemplary diagram of data packet having a validation code embedded in the data field.
Figure 3:
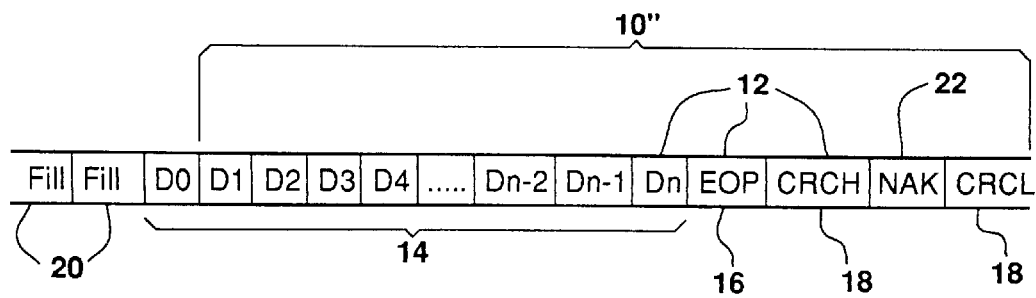
FIG. 3 an exemplary diagram of data packet having a validation code embedded in the CRC field.

Preferably, a command 22 can be embedded either anywhere within the Fill characters 20 between the data packets or within the data packets (as best illustrated in FIGS. 2 and 3). The command may, for example, provide a validation response (i.e. acknowledge (ACK), a negative acknowledge (NAK)), information about the link (i.e. transmission off (XOFF), a transmission on (XON), a synchronize (SYNC) or Fill (FILL), a remote reset (RRESET)), or may place the link into or out of a diagnostic mode (i.e. enable remote loopback (RLBON), disable remote loopback (RLBOFF), remote built-in-self-test on (RBISTON), and/or remote built-in-self-test off (RBISTOFF)). An ACK command is transmitted by the receiver to inform the transmitter that the previously transmitted data packet was received without error. A NAK command is transmitted by the receiver to inform the transmitter that the previously transmitted data packet contains erroneous information and was discarded. In practice, the "transmitter" and "receiver" may be two ends of a communications link in which either end is configured to transmit or receive data, commands, differentiation characters, etc. Thus, "transmitter" may refer to a device transmitting a data packet or a response, and a "receiver" may refer to a device receiving a data packet or a response. An XOFF command is transmitted to inform the other end of the link to halt transmission because receiving resources are not available or to stabilize the link prior to diagnostics. An XON command is transmitted, following a previous generation of an XOFF command, to inform the other end of the link that sufficient resources are now available to resume transmission. SYNC or FILL commands are generated automatically by the transmitter when data is not being sent. A RRESET command is transmitted continuously to inform the remote end of the link to perform a master reset cycle and clear all buffers. An RLBON command is transmitted to inform the remote receiver to route all received characters to the remote transmitter. An RLBOFF command is transmitted to inform the remote receiver to return to normal data handling, which is typically to route received data packets into received data packet buffers and to validate the received data packets. An RBISTON command is transmitted to inform the other end of the link to place the remote receiver into a built-in-self-testing (BIST) mode. An RBISTOFF command is transmitted to inform the other end of the link to take the remote receiver out of a built-in-self-testing (BIST) mode and back to normal data handling.

The present invention allows the command 22 to be embedded while enabling transmission of the data packet 10, 10', 10" without disturbing the data packet integrity. This is the case whether the data packet is of a known fixed length or, preferably, of a variable length defined by information in the data packet itself.

As best shown in FIG. 2, the command 22 can be embedded within the data field 14, that is, between two of the data characters. It is noted that the command 22 can be embedded before the first data character D0, between any two of the data characters D0–$D_n$, or after the final data character $D_n$.

As best shown in FIG. 3, the command 22 can be embedded in the CRC field, that is between two of the CRC characters 18. It is noted that the command 22 can alternatively be embedded before the CRC characters 18, between any two of the CRC characters 18, or after the CRC characters 18. It is also noted that the command 22 can alternatively be embedded before, between, or after any other packet characters 12 such as, for example, packet framing characters 16, fill characters 20, and/or packet information characters (not shown).

Figure 4:
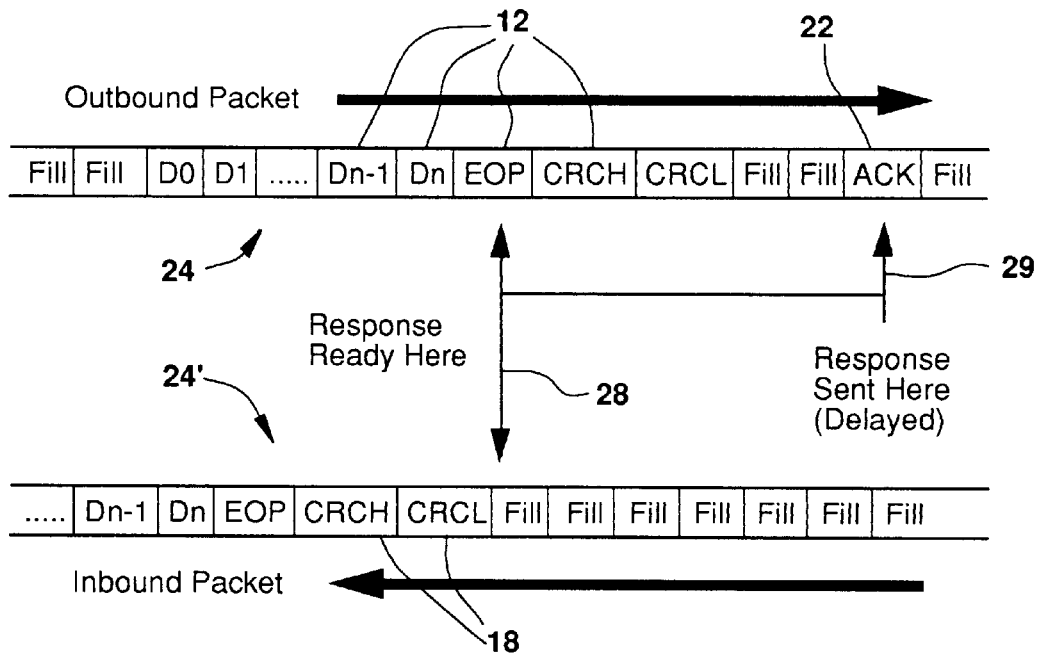
FIG. 4 is an exemplary diagram of conventional bi-directional data packets.

As is shown in the conventional data packet of FIG. 4, if a command 22 (such as the illustrated ACK command) cannot be inserted or embedded into a transmitting data packet, the command 22 will not be sent as soon as the command 22 is ready when there is an outbound data packet 24 transmitting at the time the command 22 becomes ready. The command 22 will be sent after the completion of the transmission of the outbound data packet 24. This may result in a relatively large link latency, that is the time between transmitting a data packet and receiving a response from the receiver that the transmitted data packet was received without error. As shown in FIG. 4, there is a delay between the time when the response is ready to be transmitted (when the CRC characters 18 of the inbound packet 24' are received and verified as indicated by arrow 28) and the time when the response is transmitted (when the ACK command 22 is transmitted as indicated by arrow 29). The separation between the arrows 28, 29 indicates that there is a delay between the time when the response is ready and the time when the response is sent.

Figure 5:
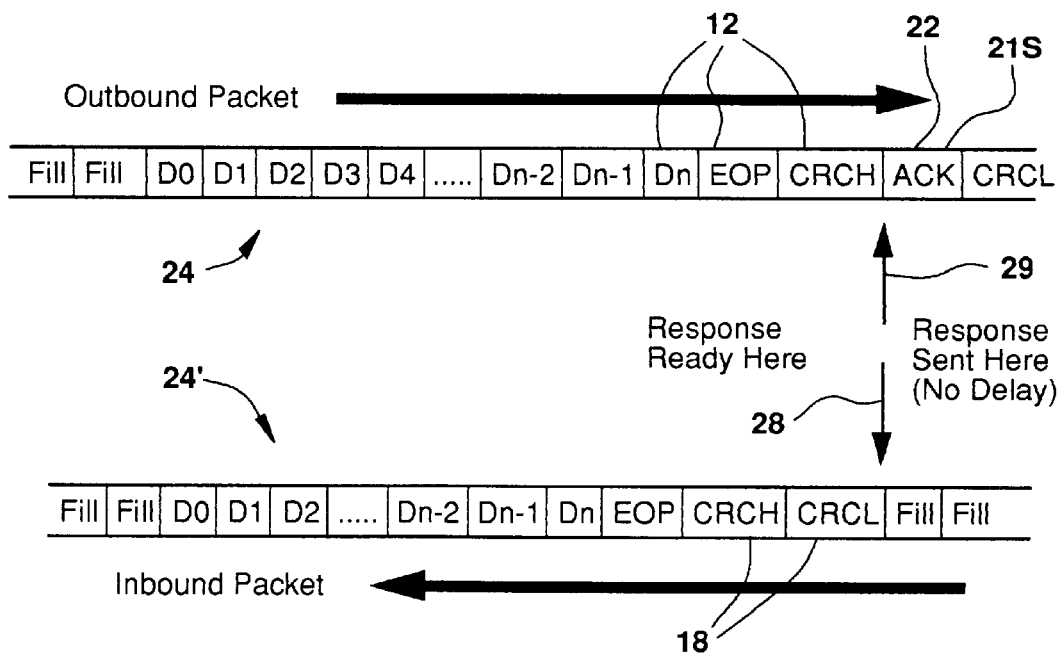
FIG. 5 is an exemplary diagram of bi-directional data packets in which the outbound packets contain an embedded response generated in response to the correctly received inbound packet.

As best shown in FIG. 5, the command 22 (such as the illustrated ACK command) is preferably inserted into an outgoing data packet 24 as soon as the command 22 is available, if there is an outgoing data packet 24 being transmitted at the time the response becomes ready, so that link latency is minimized. In an ideal case, the command 22 is inserted into the outbound data packet 24 immediately after the CRC characters 18 of the received or inbound data packet 24' are received and verified. As shown in FIG. 5, there is preferably no delay between the time when the response is ready to be transmitted (when the CRC characters 18 of the inbound packet 24' are received and verified as indicated by arrow 28) and the time when the response is transmitted (when the ACK command is transmitted as indicated by arrow 29). The alignment of the arrows 28, 29 indicates that the response is sent immediately and without delay.

The command 22 can be of any length and combination of data characters and command characters and includes at least one differentiation character 26. A differentiation character 26 is a character which is different from any data character. The differentiation character 26 is a character which exists outside the character space (typically of 256 characters) used to transmit data. The differentiation character 26 allows the command 22 to be separated from the data packet 24, at the remote end of the link, using a simple state machine.

An example of defining differentiation characters follows. First, all the data bytes can be converted to m-bit code words (m being an integer), such as 10-bit code words, where these code words are used to transmit the data characters. Each character can be represented by one or more code words. Second, the differentiation characters can then be selected from unused code words.

The command 22 should normally be kept as short as possible such as a single character, to keep overhead to a minimum. Therefore, as illustrated in FIG. 5, the entire command 22 is most preferably transmitted using a single differentiation character 26. The command 22 can alternatively be transmitted using multiple characters made up entirely or partly of differentiation characters. For example, at least one differentiation character can precede at least one non-differential character. The receiver detects the differentiation character and uses it to both decode the command received and to disable processing as data any received data characters until a defined length of the embedded command has been received. For a further example, at least one non-differentiation command character can precede a differentiation character which differentiates the embedded command characters from other packet characters. Such a use may complicate the method by requiring one or more steps of recapturing the preceding command characters (preferably, [n−1] recapturing steps for [n] characters in the command, n being an integer). Preferably, commands are defined with a fixed length and are transmitted without interruption.

Once the command(s) 22 is/are defined, transmitting the data packet 24 and embedding the command(s) 22 into the data packet 24 is straightforward. The packet characters 12 of the data packet 24 are preferably transmitted one byte at a time until the command 22 is required. When a command 22 such as an ACK is required, transmission of the packet characters 12 is suspended on the next character boundary. The command 22 is inserted into the data stream and transmitted without interruption, preferably, by transmitting a single differentiation character 26. The receiver preferably reacts immediately to the receipt of the transmitted command. After the command 22 is transmitted, transmission of the packet characters 12 is resumed. By stalling the transmission of packet characters, no data is lost. It is apparent from the above description that the transmitted data packet is modified by the need to immediately transmit a command, such as the status of a received data packet.

It should be noted that this procedure allows multiple commands, such as ACK commands, to be transmitted within a single data packet. It should also be noted, that while the illustrated data packet 24 includes an embedded command, some data packets may include no embedded commands and some commands may randomly fall between data packets, immediately before a data packet, or immediately after a data packet.

To receive a data packet with an embedded command, the packet characters of the data packet are received until the differentiation character of the command is received. When the differentiation character is received, the receipt of packet characters is suspended. The command is then received (or recaptured as noted previously). After the command is received, receipt of the packet characters resumes.

DATA MOVER

Figure 6:
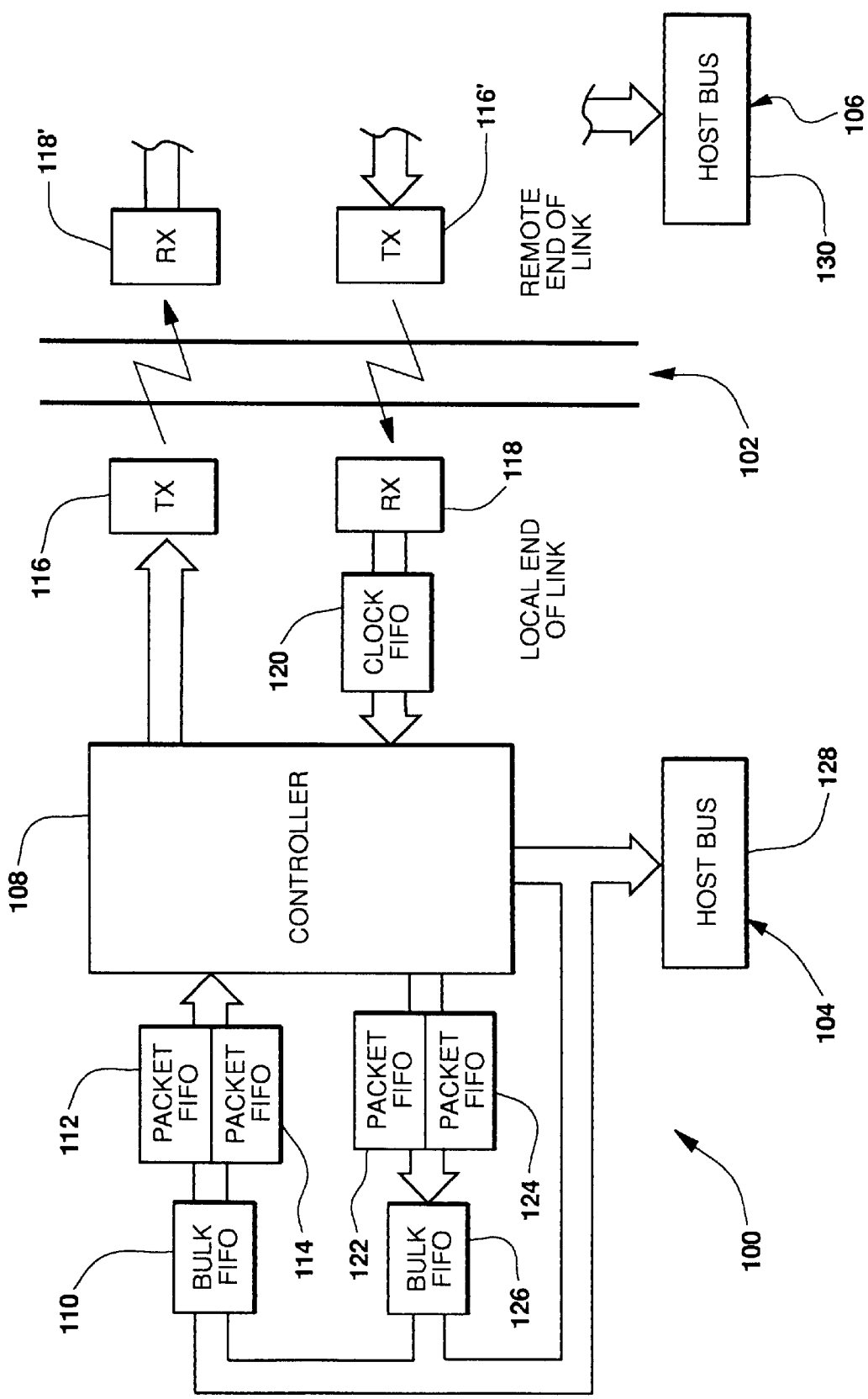
FIG. 6 is a block diagram of a data mover.

FIG. 6 diagrammatically illustrates a data mover 100 which operates as a "digital modem equivalent" by bi-directionally moving continuous streams of data between two points. Data is transferred over a bi-directional point-to-point serial link 102 to interconnect local and remote systems 104, 106 such as, for example, workstations, servers, mass storage, and video transmission equipment. The serial link 102 is preferably a high-speed point-topoint serial link such as, for example, optical fiber, coaxial cable, or twisted-pair cable.

The data mover 100 preferably operates as a peer-to-peer connection, that is, the remote end of the link is totally symmetrical to the local end of the link. Accordingly, only the local end of the link is illustrated and described herein in detail.

The data mover 100 includes a controller 108 which controls transmit data along a transmit data path and controls receive data along a receive data path. The transmit data path include a bulk data memory 110, first and second data packet memories 112, 114, and a data transmitter 116. The receive data path includes a data receiver 118, a data memory 120, first and second data packet memories 122, 124, and a bulk data memory 126. Each data storage element 110, 112, 114, 120, 122, 124, 126 is preferably a synchronous first-in-first-out (FIFO) memory. The use of first-in-first-out (FIFO) memories simplifies the operation of the data mover 100. In particular, operation of the FIFO memories minimizes the need for large numbers of address counters and address-pin connections and inherently provides dual port operation. It is noted that each data storage element can alternatively be any suitable type of memory structure such as, for example, asynchronous FIFO, SRAM, DRAM, and Dual-Port RAM.

The controller 108 communicates with, and preferably is directly connected to, a host bus 128 of the local system 104. The controller 108 is preferably connected to the host bus 128 through a host control port to allow the local and remote ends of the link to place the link into various diagnostic modes and to monitor for link errors.

The data mover 100 is preferably provided with link level diagnostic modes or functions such as, for example, built-in-self-testing (BIST) and data loopback functions. The link level diagnostic functions allow the communications link to be maintained through the diagnostic functions and allow the diagnostic functions to be split across multiple interface points so that failures or marginal performance can be localized often to a specific component of the link. The diagnostic modes preferably include a local BIST which allows diagnostics of serializer and deserializer components and remote BIST which allows diagnostics of the serial link 102. The loopback functions preferably include local data loopback which allows diagnostics of the controller 108 and the data storage elements 110, 112, 114, 120, 122, 124, 126 and remote data loopback which allows diagnostics of the controller at the remote end of the link.

The default mode of operation of the data mover 100 is preferably to move data while alternate modes of operation are generally diagnostic in nature. The host interface preferably includes a writable control register and a readable status register to control and monitor the alternate modes of operation. The registers allow the various interfaces to be placed into the various BIST and loopback functions, as well as controlling resets of both the local and remote ends of the link. Local operations are performed without sending information across the link, while remote operations are initiated by sending commands (specific characters or character sequences) across the link to the remote controller.

The controller 108 also manages the transfer of data between the data packet memories 112, 114 and the transmitter 116. Preferably, the controller 108 is directly connected to both the data packet memories 112, 114 and the transmitter 116. The controller 108 preferably manages data and commands sent to the transmitter 116 and received by the receiver 118. Functions of the controller 108 preferably include transferring data to and from the transmit bulk data memory 110 and the transmit data packet memories 112, 114, generating CRC based on data read from the data packet memories 112, 114, moving data to and transmitting data from the transmitter 116, receiving data and CRC from the receiver 118, verifying that the data and CRC were received from the remote end of the link without error, generating and sending validation responses for received data, storing and retransmitting transmitted data packets, and transferring data to and from the receive data packet memories 122, 124 and the receive bulk data memory 126. In addition, the controller 108 is responsible for generating commands to format the data packets such as, for example, data packet framing commands and fill characters. The controller 108 includes a logic circuit such as, for example, a field programmable gate array (FPGA), a media access controller, or a general purpose computer. A suitable FPGA is available from Cypress Semiconductor Corporation, San Jose, Calif., part number CY7C386A.

The transmit bulk data memory 110 is in communication with, and preferably directly connected to, the host bus 128 and is used to hold or store data generated by the local system 104 for transmission to a host bus 130 of the remote system 106. The transmit bulk data memory 110 is also in communication with, and preferably directly connected to, the first and second data packet memories 112, 114. The transmit bulk data memory 110 provides a buffer between the first and second data packet memories 112, 114 and the host bus 128. A suitable transmit bulk data memory 110 is available from Cypress Semiconductor Corporation, San Jose, Calif., part number CY7C453. Alternately, the local system 104 can include a bulk data memory to provide a buffer between the first and second data packet memories 112, 114 and the local system 104.

The transmit data packet memories 112, 114 communicate, and preferably directly connect, the transmit bulk data memory 110 with the controller 108 and are used to segment and transmit data stored in the transmit bulk data memory 110. While the transmit data packet memories 112, 114 can be of any size, they are preferably smaller than the transmit bulk data memory 110. Suitable transmit data packet memories 112, 114 are available from Cypress Semiconductor Corporation, San Jose, Calif., part number CY7C451.

The first and second transmit data packet memories 112, 114 are arranged in parallel and operate in either a loading mode or an unloading mode. In the loading mode, the data packet memories 112, 114 function to load or receive data from the bulk data memory 110 to form a data packet for transmission to the remote system 106. In the unloading mode, the data packet memories 112, 114 function to unload or transfer a loaded data packet to the transmitter 116 through the controller 108.

In operation, one of the data packet memories 112, 114 is typically in the loading mode while the other one of the data packet memories 112, 114 is in the unloading mode. For example, once a data packet is transmitted from the first data packet memory 112 in the unloading mode and valid reception of the transmitted packet is acknowledged by the remote system 106, the modes or functions of the first and second data packet memories 112, 114 can be swapped. The next data packet can be transmitted from the second data packet memory 114 in the unloading mode while the first data packet memory 112 in the loading mode is receiving data from the bulk data memory 110. After the data packet is transmitted from the second data packet memory 114 in the unloading mode and valid reception of the transmitted data packet is acknowledged by the remote system 106, the modes or functions of the first and second data packet memories 112, 114 can be swapped.

The modes of the first and second data packet memories 112, 114 continue to alternate as long as there is data to be transmitted from the bulk data memory 110 to the remote system 106. It is apparent from the above description that the parallel first and second data packet memories 112, 114 allow overlapped unloading and loading operations, that is, as one data packet is being transmitted and held for validation, the next packet can be simultaneously loaded.

Each data packet memory 112, 114 is used to segment or sequence out the data loaded into the transmit bulk data memory 110. This segmentation creates small packets in the transmit data packet memories 112, 114. At any point in time, there can not be more than one data packet in each transmit data packet memory 112, 114. A data packet is created at the point in time when the mode of a data packet memory 112, 114 is changed from the loading mode to the unloading mode. While some concept of data packets may exist at the host level, the data mover 100 is preferably unaware of that host level packetization.

For example, as soon as data is loaded into the first data packet memory 112 which is in the loading mode, and no unacknowledged data packet remains in the second data packet memory 114 in the unloading mode, the modes of the first and second data packet memories 112, 114 are swapped. Therefore, data transfer occurs without waiting for a predetermined amount of data or for the first data packet memory to be full before starting to transfer the data from the first data packet memory 112 to the remote system 106. When the local system 104 provides data to the bulk data memory 110 at a relatively fast rate, that is a relatively fast load rate, the amount of data written into the data packet memory 112, 114 in the loading mode increases in consecutive packets until link performance is preferably limited by serial transfer rate and/or acknowledgment turnaround delays.

In addition to reading data from the data packet memory 112, 114 in the unloading mode for transmitting the data packet, the controller 108 also inputs the same data packet back into the same data packet memory 112, 114 so that the same data packet is written back into the same data packet memory 112, 114. This data loopback allows the data packet to be retransmitted if a transmission error is reported by the remote system 106. This loopback is preferably performed by multiplexers (not shown) such as, for example, bus switches operating as multiplexers. Suitable bus switches are available from Cypress Semiconductor Corporation, San Jose, Calif., part number CYBUS3384. Alternatively, data memory elements such as FIFOs SRAMs, and DRAMs are available that support a native retransmit capability by resetting an internal address pointer. Data memory elements with this capability do not need to recirculate or loopback data to allow retransmission of the data.

The transmitter 116 is in communication with, and preferably directly connected to, the controller 108. The transmitter 116 is preferably a point-to-point transmitter which transfers data at high speeds such as, for example, in the range of about 160to about 400 Mbits/second. A suitable transmitter 116 is a HOTLink™ transmitter (e.g., part number CY7B923) available from Cypress Semiconductor Corporation, San Jose, Calif.

The receiver 118 is in communication with the controller 108 which validates the received data and stores the validated data for use by the local system 104. The receiver 118 is preferably a point-to-point receiver which receives data at high speeds such as, for example, in the range of about 160 to about 400 Mbits/second. A suitable receiver 118 is a HOTLink™ receiver (e.g., part number CY7B933) available from Cypress Semiconductor Corporation, San Jose, Calif.

The HOTLink™ transmitter, suitable as transmitter 116, and the HOTLink™ receiver, suitable as receiver 118, are each described in detail in Cypress HOTLink User's Guide, published June 1995, which is hereby expressly incorporated herein in its entirety by reference.

Preferably, the receiver 118 is directly connected to the data memory 120 which is directly connected to the controller 108. The data memory 120 changes the clock domain of the received data to the same clock domain as the transmit data. A suitable data memory 120 is available from Cypress Semiconductor Corporation, San Jose, Calif., part number CY7C451. Alternatively, the receiver 118 can be directly connected to the controller 108 with the clock output of the receiver 118 used to clock receive data operations in the controller 108. It is noted that the data memory 120 of the preferred embodiment may avoid a number of asynchronous paths generated between the various components in this alternative embodiment.

The receive data packet memories 122, 124 communicate, and preferably directly connect, the controller 108 with the receive bulk data memory 126 and are used to hold received data until that data has been validated by the packet CRC, and upon validation to unload that data to the receive bulk data memory 126. The receive data packet memories thereby re-constitute a data stream by placing the received data packets (created by the remote controller transmit path) into consecutive locations in the receive bulk data memory 126. While the receive data packet memories 122, 124 can be of any size, they are preferably smaller (in terms of bytes) than the receive bulk data memory 126. The receive data packet memories 122, 124 are also preferably equal to or larger than the transmit data packet memories 112, 114 to prevent overflow of the receive data packet memory. Suitable receive data packet memories 122, 124 are available from Cypress Semiconductor Corporation, San Jose, Calif., part number CY7C451.

The first and second receive data packet memories 122, 124 are arranged in parallel and operate either in a loading mode or an unloading mode. In the loading mode, the data packet memories 122, 124 function to load or receive a received data packet from the remote system 106 and store the received data packet until the data packet is validated or acknowledged as being received without error. In the unloading mode, the data packet memories function to unload or transfer the received and validated data packet to the receive bulk data memory 126. If a received data packet is in error, the data packet memory 122, 126 storing the data packet is cleared by a master reset cycle from the controller 108 to discard the bad data. Following the master reset cycle, the remote end of the link is instructed to re-transmit the data packet.

In operation, one of the data packet memories 122, 124 is typically in the loading mode while the other one of the data packet memories 122, 124 is in the unloading mode. For example, once a data packet is received by the first data packet memory 122 in the loading mode, the modes or functions of the two data packet memories 122, 124 are swapped. Now in the unloading mode, the first data packet memory 122 is configured to transfer the data to the bulk data memory 126. The second data packet memory 124, now in the loading mode, can be simultaneously receiving another data packet from the remote system 106. When the next data packet is completely received by the second data packet memory 124 and the first data packet memory 122 has completely emptied into the bulk data memory 126, the modes or functions of the two data packet memories 122, 124 are swapped.

The modes of the data packet memories 122, 124 continue to alternate as long as data packets are received from the remote system 106. It is apparent from the above description that the two parallel data packet memories 122, 124 allow overlapped loading and unloading operations, that is, as one validated data packet is being transferred to the bulk data memory 126, the next data packet can be simultaneously received.

The receive bulk data memory 126 is in communication with, and preferably directly connected to, the receive data packet memories 122, 124 and is used to hold or store validated data packets received from the receive data packet memories 122, 124. The receive bulk data memory 126 is also in communication with, and preferably directly connected to, the host bus 128 and provides the validated data for use by the local system 104. The receive data memory 126 provides a buffer between the receive data packet memories 122, 124 and the host bus 128. A suitable receive bulk data memory 126 is available from Cypress Semiconductor Corporation, San Jose, Calif., part number CY7C453. Alternately, the local system 104 can include a bulk data memory to provide a buffer between the first and second data packet memories 122, 124 and the local system 104.

As noted above, the data mover 100 preferably provides varying data packet lengths due to the automatic segmentation by the first and second transmit data packet memories 112, 114 and depending on the link load. In general, as the link nears capacity, the data packet lengths approach a length determined by the full capacity of the transmit data packet memories 112, 114. At lesser-loads, the data packet lengths are set by the link latency, that is, the time required to receive a validation response for a transmission (i.e., as soon as an ACK is received, the transmit data packet memories 112, 114 switch modes and a new data packet starts to be transmitted (assuming there is at least some data in the data packet memory 112, 114 that was enabled for loading)). Generally, at lesser loads, the length of the data packets increases as the link latency increases and the length of the data packets decreases as the link latency decreases. It is noted that the controller 108 may also be instructed to enforce a minimum data packet size.

Figure 7:
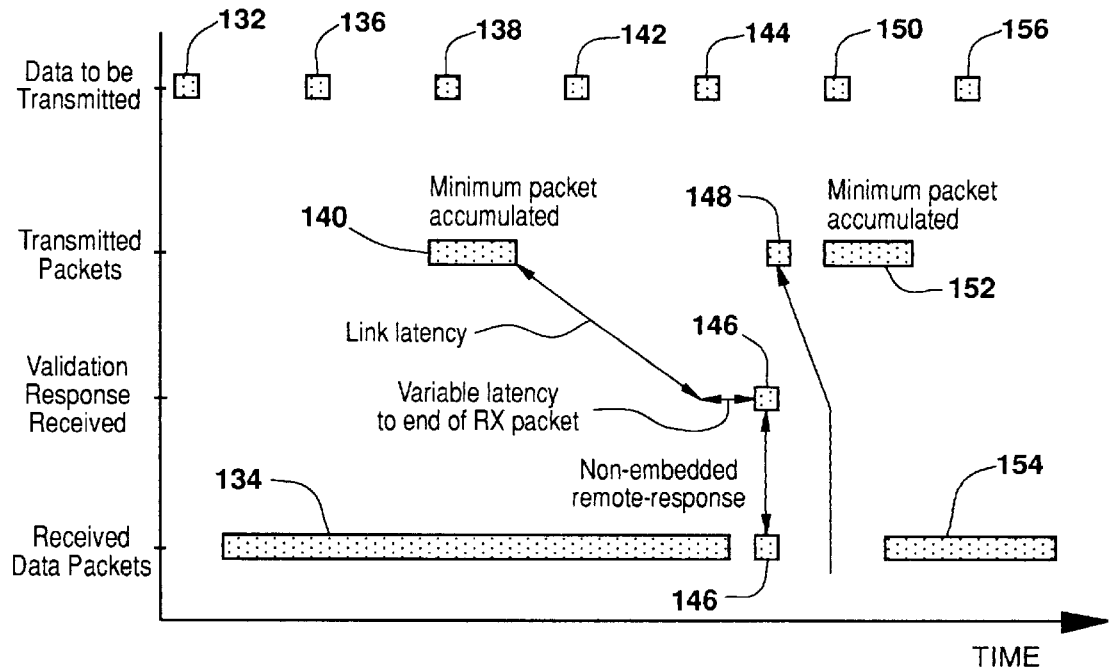
FIG. 7 is a graphical representation of the operation of exemplary conventional data movers.

FIG. 7 diagrammatically illustrates a sample period of time for a conventional bidirectional data mover. Data arrives from a local system at a relatively slow rate and arrives from a remote system at a relatively fast rate. Initially, a first block of data 132 arrives from the local system. The first block of data 132 is loaded into memory and held because a minimum data packet size is not met solely by the first block of data 132. A first receive data packet 134 begins to arrive from the remote end of the link.

A second block of data 136 arrives and is loaded into memory. The accumulated data is held because the minimum data packet size is still not met by the first and second blocks of data 132, 136. A third block of data 138 arrives and is loaded into memory. The first, second, and third blocks of data 132, 136, 138 meet the minimum data packet size and form a first transmit data packet 140 which is transmitted to the remote end of the link. Validation of the first data packet 140 is performed at the remote end of the link. If the first transmit data packet 140 is validated, a validation response or ACK will arrive from the remote end of the link at or following the completion of the first receive data packet 134.

A fourth block of data 142 arrives, is loaded-into memory, and held because a minimum data packet size is not met. A fifth block of data 144 arrives and is loaded into memory. The accumulated data is held because the minimum data packet size is not met by the fourth and fifth blocks of data 142, 144.

Receipt of the first receive data packet 134 is completed. A first validation response or ACK 146 is received from the remote end of the link. It is noted that the first validation response 146 was not embedded in the first receive data packet 134. The first validation response 146 could not be transmitted from the remote end of the link until the transmission of the first receive data packet 134 was completed. The first receive data packet 134 is validated at the local end of the link and a first validation response or ACK 148 is generated and transmitted to the remote end of the link.

A sixth block of data 150 arrives and is loaded into memory. The fourth, fifth, and sixth blocks of data 142, 144, 150 meet the minimum data packet size and form a second transmit data packet 152 which is transmitted to the remote end of the link. If the second data packet 152 is validated at the remote end of the link, a validation response or ACK will arrive from the remote end of the link at the completion of the second receive data packet 154 which has begun to arrive. A seventh block of data 156 arrives, is loaded into memory, and held because a minimum data packet size is not met. Operation of the data mover continues as described above.

Figure 8:
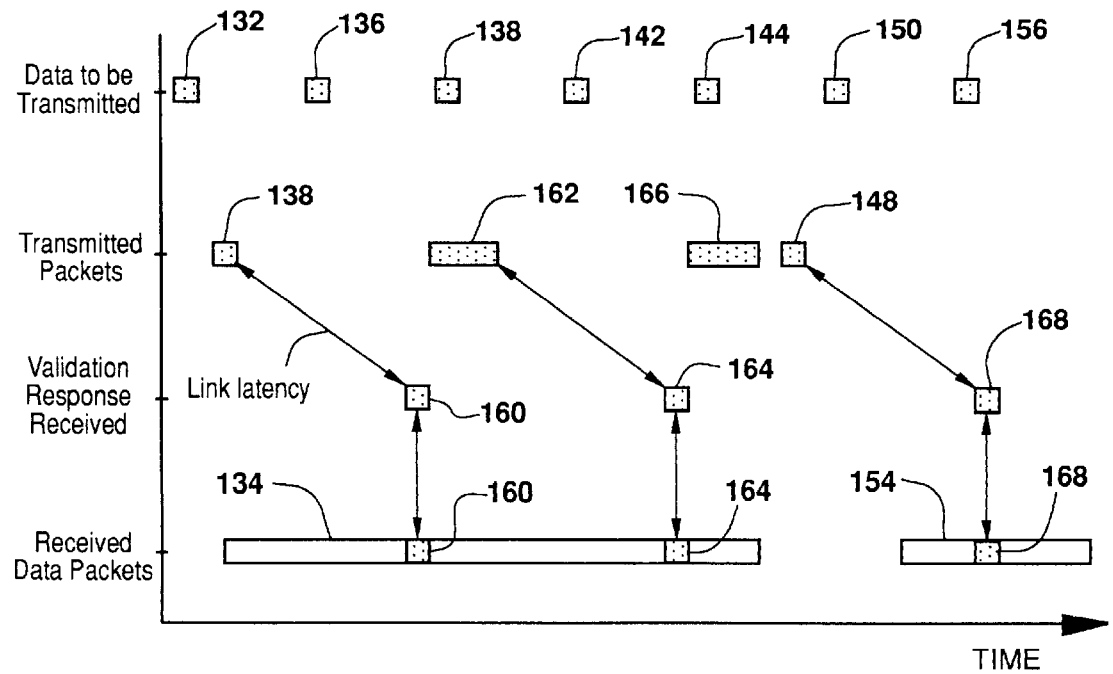
FIG. 8 is a graphical representation of the operation of the data mover of FIG. 6.

FIG. 8 diagrammatically illustrates a sample period of time for the data mover 100 (FIG. 6) similar to FIG. 7 for the conventional data mover. Data arrives to the transmit bulk data memory 110 at a relatively slow rate and data arrives to the receiver 118 at a relatively fast rate. Initially, a first block of data 132 arrives at the transmit bulk data memory 110 from the host bus 128 of the local system 104. The first block 132 is loaded into the first data packet memory 112 which is in the loading mode. Because no unvalidated packets are in the second data packet memory 114 which is in the unloading mode, the controller 108 swaps the modes of the data packet memories 112, 114. The first block 132 of data stored in the first data packet memory 112 is automatically segmented into a first data is packet 158.

The controller 108 generates CRC based on the data within the first data packet 158 and appends the CRC to the end of the first data packet 158. The controller 108 also generates and inserts various command characters to format the first data packet 158 such as, for example, framing commands. The controller 108 then transfers the first data packet 158 to the transmitter 116 for transmission to the receiver 118' at the remote end of the link. The first data packet 158 is also recirculated back to the first data packet memory 112 to allow retransmission if necessary.

The receiver 118 begins to receive a first receive data packet 134 from the transmitter 116' of the remote end of the link which is stored in the first receive data packet memory 122. A second block of data 136 arrives at the transmit bulk data memory 110 and is loaded into the second data packet memory 114 which is in the loading mode. The first data packet memory 112 continues to hold the first data packet 158 while waiting for validation of the transmitted first data packet 158.

Validation of the first data packet 158 at the remote end of the link is preferably performed by clocking all data and CRC bytes into a CRC register and checking for a fixed remainder. An error in the received data exists if the fixed remainder is not present. Alternatively, the controller at the remote end of the link can calculate a CRC based on data within the received first data packet 158 and compares it with the CRC at the end of the first data packet 158. An error in the received data exists if the CRCs are not the same.

If the first data packet 158 is validated, a first validation response or ACK 160 is generated by the remote controller and transmitted by the remote transmitter 116'. The first validation response 160 is received from the remote end of the link by the receiver 118.

It is noted that the first validation response 160, the illustrated example, is embedded in the first receive data packet 134. Preferably, validation responses or other commands may be embedded in either received or transmitted data packets in order to obtain minimum link latency. These embedded commands may include, for example, ACK, NAK, and commands to put the data mover 100 into the diagnostic modes such as the remote data loopback, the local data loopback, the remote BIST, and the local BIST. The controller 108 can preferably insert commands immediately into outgoing traffic without waiting for the completion of the transmission. The controller 108 can also preferably intercept commands from within incoming traffic whenever embedded therein.

A third block of data 138 arrives at the transmit bulk data memory 110 and is loaded into the second data packet memory 114 which remains in the loading mode. Because the first validation response 160 is received from the remote end of the link, the controller 108 swaps the modes of the data packet memories 112, 114. If an error response or NAK would have been received from the remote system 106, the swapping of the modes would be delayed and the controller 108 would again enable the first data packet memory 112 to transfer the first data packet 158 to the transmitter 116 for transmission to the remote system 106.

The second and third blocks of data 136, 138 stored in the second data packet memory 114 are automatically segmented into a second data packet 162. The controller 108 transfers the second data packet 162 to the transmitter 116 for transmission to the receiver 118' at the remote end of the link. The second data packet 162 is also recirculated back to the second data packet memory 114 to allow retransmission if necessary.

A fourth block of data 142 arrives at the transmit bulk data memory 110 and is loaded into the first data packet memory 112 which is in the loading mode. The second data packet memory 114 continues to hold the second data packet 162 while waiting for validation of the transmission of the second data packet 144. A second transmit validation response or ACK 164 is received from the remote end of the link by the receiver 118. In the illustrated example, the second transmit validation response or ACK 164 is embedded in the first receive packet 134. A fifth block of data 144 arrives at the transmit bulk data memory 110 and is loaded into the first data packet memory 112 which remains in the loading mode.

Because the second validation response 164 is received from the remote end of the link, the controller 108 swaps the modes of the data packet memories 112, 114. The fourth and fifth blocks of data 142, 144 stored in the first data packet memory 112 are automatically segmented into a third data packet 166. The controller 108 transfers the third data pack 166 to the transmitter 116 for transmission to the receiver 118' at the remote end of the link. The third data packet 166 is also recirculated back to the first data packet memory 112 to allow retransmission if necessary.

Receipt of the first receive data packet 134 is completed. The first receive data packet 134 is validated at the local end as discussed above with reference to the validation of the first transmit data packet 158 at the remote end of the link. If the first received data packet 134 is validated, a first validation response or ACK 148 is generated by the controller 108 and transmitted by the transmitter 116 to the remote end of the link.

A sixth block of data 150 arrives at the transmit bulk data memory 110 and is loaded into the second data packet memory 114 which is in the loading mode. The first data packet memory 112 continues to hold the third data packet 166 while waiting for validation of the transmission of the third data packet 166. A third transmit validation response or ACK 168 is received from the remote end of the link by the receiver 118 which, in the illustrated example, is embedded in a second receive data packet 154. A seventh block of data 156 arrives at the transmit bulk data memory 110 and is loaded into the second data packet memory 114 which remains in the loading mode. Because the third transmit validation response 168 is received from the remote end of the link, the controller 108 swaps the modes of the data packet memories 112, 114. Operation of the data mover 100 continues as described above.

In the illustrated example, the rate of delivery of data to the bulk data memory 110 is slower than the transfer rate of data across the link 102. Therefore, except in the case of a failed transmission that must be retransmitted, data will typically not remain in the transmit bulk data memory 110 longer than is necessary to load that data into the transmit bulk data memory 110 (plus any link response overhead). Although this may not maximize link throughput under slow data rate conditions, it does minimize latency, that is, the time until the data can be used. It is noted that when the delivery of data to the bulk data memory 110 is faster than the transfer rate of data across the link 102, it is possible to completely fill the bulk data memory 110.

It should be noted that the data packets described herein may be just portions of higher level data packets being managed elsewhere in the local system 104.

It should also be noted that a third data packet memory could be added to both the transmit and receive paths to remove data packet acknowledge time from the link overhead. This lowers the link overhead, and thereby increases the sustainable data rate. However, link latency is not reduced.

INTERRUPTIBLE STATE MACHINE

Preferably, the controller 108 (FIG. 6) includes a logic circuit which can be analyzed in terms of a state machine. This allows the controller 108 to be implemented with a FPGA or other suitable logic circuit such as, for example, a PLD, CPLD, MSI, SSI, gate array, standard cell, or full custom circuitry. State machines typically identify separate states and a set of transitions from one state to the next state. The transitions from one state to the next state are typically determined by the present state of the machine and input conditions. Each state of the machine may be used to decode one or more outputs.

Figure 9:
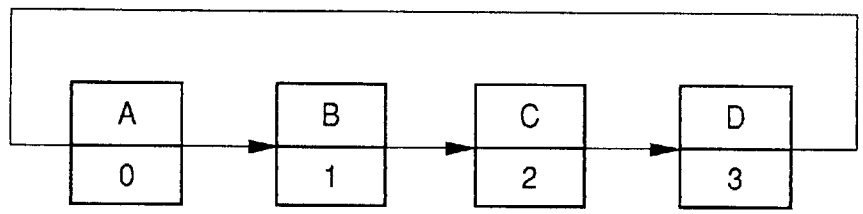
FIG. 9 is a state diagram for a conventional state machine having four states (four normal states with no inputs)

FIG. 9 illustrates a state diagram for a simple clocked state machine having no inputs. The state machine has four normal states, A through D, which generate respective outputs, 0 through 3. When the present state is state A, the output generated is 0 and, when the execution of state A is complete, the machine transitions to the next state which is state B. When the present state is state B, the output generated is 1 and, when the execution of state B is complete, the machine transitions to the next state which is state C. The machine continues to transition from state to state and to generate the specific outputs.

Figure 10:
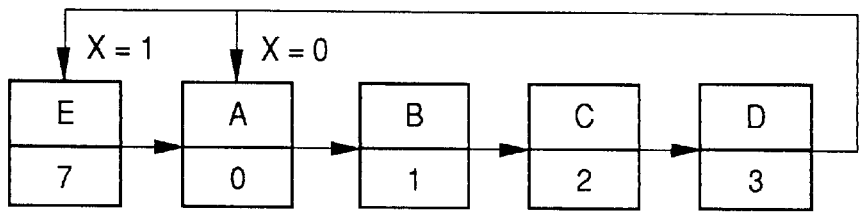
FIG. 10 is a state diagram of a conventional state machine having five total states (four normal states with one additional state for one-input at one normal state)

Some machines need to react to input conditions when in a particular state. For example, suppose the machine of FIG. 9 was required to generate the identified outputs in each of the states, but react to an input X only in state D. FIG. 10 illustrates a state diagram for a simple clocked state machine similar to the machine of FIG. 9 but capable of reacting to input X only when in the present state of state D. It can be seen that such a machine requires an additional state E. When the machine is in state D and the input X is active (X=1), the machine transitions to new state E and generates an output of 7. Following execution of state E, the machine returns to the next normal state which is state A. When the machine is in state D and the input X is inactive (X=0), the machine transitions to the next normal state which is state A. The remainder of the machine operates in the manner previously described. It is noted that this machine is only capable of reacting to input X when the machine is in state D.

Figure 11:
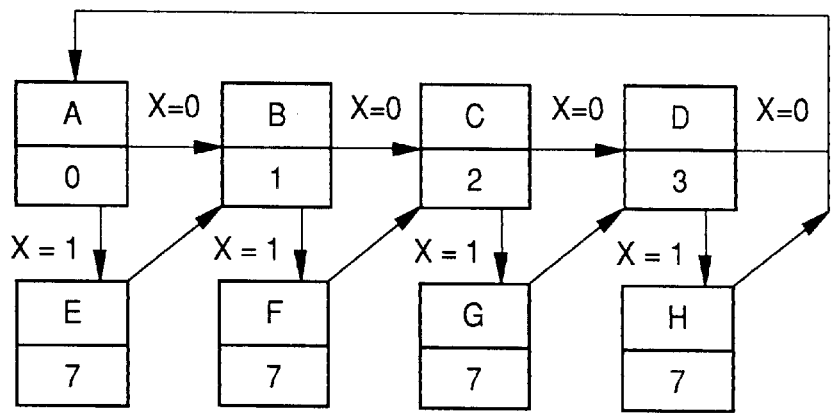
FIG. 11 is a state diagram of conventional state machine having eight total states (four normal states and four additional states for one input at each of the normal states)

Some machines need to react to the same input condition when in more than one normal state of the machine. For example, suppose the machine of FIG. 3 was required to generate the identified outputs in each of the normal states A–D and also react to input X in each of the normal states A–D to generate a single output. FIG. 11 illustrates a state diagram for a simple clocked state machine similar to the machine of FIG. 9 but capable of reacting to the input X in each of the normal states A–D to generate an output of 7. It can be seen that such a machine requires a complete set of four additional states E–H.

When the machine is in normal state A and the input X is active (X=1), the machine transitions to new state E and generates an output of 7. Following execution of state E, the machine returns to the next normal state which is state B. When the machine is in state A and the input X is inactive (X=0), the machine transitions to the next normal state which is state B. The machine similarly reacts to the input X in each of the other normal states B–D. It is noted that this machine is capable of reacting to input X when the machine is in any of the normal states A–D.

The four additional states E–H, required to implement the machine, effectively double the size of the machine from four total states to eight total states. If a second input Y is needed to generate a single output of, for example, 6 in each of the normal states A–D, then four more additional states would be needed and would effectively triple the size of the machine from four total states to twelve total states. This state expansion continues as increased numbers of inputs are needed and increases the complexity of the machine. For example, the state expansion requires many more P-terms (product terms), the P-terms control a large state register to allow the machine to generate each of the new states necessary to process the input conditions, the complexity of the P-terms used to decode each state increases, and increases the power dissipation of the circuit while the more complex logic slows down the circuit.

In the present invention, the controller 108 (FIG. 6) preferably responds to both data packets and to commands between the data packets or embedded within the data packets (as best shown in FIGS. 2 and 3). As discussed in more detail above, these commands can come at any time. As a result, a standard state machine would, in general, have its number of states multiplied by the number of possible embedded commands or inputs. It has been found that this results in wasted logic in the logic circuit, as well as more complex analysis and design as described above.

Figure 12:
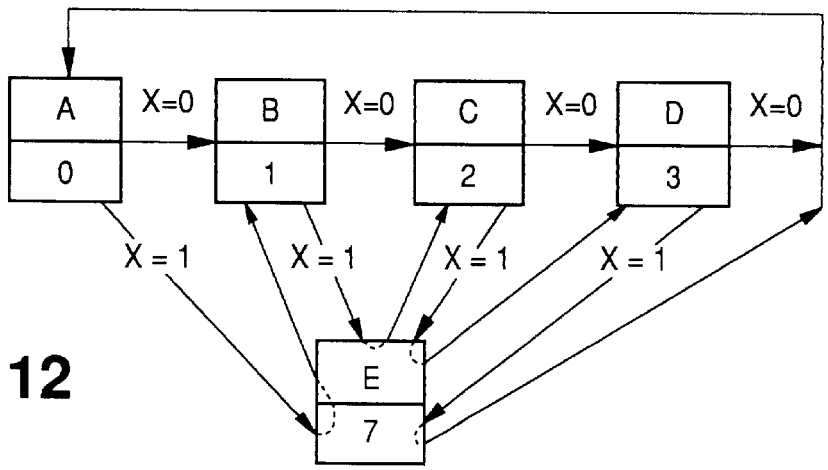
FIG. 12 a state diagram of a state machine having five total states (four normal states and one additional state for one-input at each of the normal states)

FIG. 12 illustrates a state diagram for an interruptible state machine according to the present invention. The machine is similar to the machine of FIG. 11 in that it is capable of reacting to the input X in each of the normal states A–D to generate an output of 7 but requires only one additional state E.

When the machine is in state A and the input X is active (X=1), the machine transitions to new state E and generates an output of 7. Following execution of state E, the machine returns to the next normal state which is state B. When the machine is in state A and the input X is inactive (X=0), the machine transitions to the next normal state which is state B. When the machine is in state B and the input X is active (X=1), the machine again transitions to new state E and generates an output of 7. Following execution of state E, the machine returns to the next normal state which is state C. When the machine is in state B and the input X is inactive (X=0), the machine transitions to the next normal state which is state C. The machine similarly reacts to the input X in states C and D and transitions to either new state E or the next new state. It is noted that this machine has a single additional state E and is capable of reacting to input X when the machine is in any of the normal states A–D.

Figure 13:
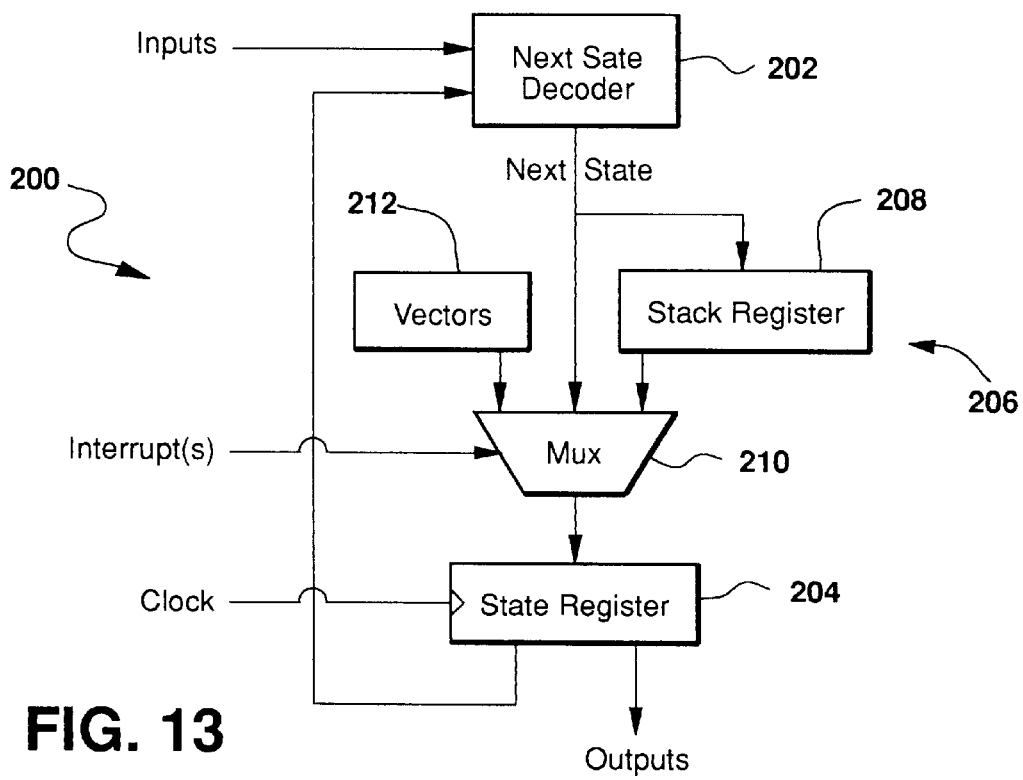
FIG. 13 is a block diagram of an interruptible state machine.

FIG. 13 diagrammatically illustrates one embodiment of the present interruptible state machine 200 which allows reaction to one or more interrupts in each normal state with a single additional state (as discussed with regard to FIG. 12) rather than an additional state for each normal state (as discussed with regard to FIG. 11). The machine 200 includes a next state decoder 202, a state register 204, and an interrupt processor 206. The interrupt processor 206 enables the machine 200 to respond to a given interrupt in any present state and then return to the next normal state.

The interrupt processor 206 includes a stack register 208, a multiplexor 210, and interrupt vectors 212. The multiplexor 210 communicates, and preferably directly connects, the next state decoder 202 with the state register 204. The stack register 208 communicates, and preferably directly connects, the next state decoder 202 with the multiplexor 210. The interrupt vectors 212 are in communication with, and preferably directly connected to, the multiplexor 210.

When no interrupt (e.g., an embedded command) is active, the state register 204 is loaded with information of the next state from the next state decoder 202 through the multiplexor 210. The interrupt processor 206, however, enables this loading to be stalled or held-up when an interrupt is active. When the interrupt occurs, the multiplexor 210 blocks the next state from loading into the state register 204 from the next state decoder 202. Instead the next state is loaded into and stored within the stack register 208. The multiplexor 210 loads a vector, which is assigned to the specific input or interrupt and corresponds to the desired output, into the state register 204 from the interrupt vectors 212. Thereafter, when the interrupt routine completes (which may be as short as a single state), the multiplexor 210 loads the original next state into the state register 204 from the stack register 202 where the next state was stored at the interruption. Therefore, the machine 200 resumes where it left off before the interruption.

It can be seen from the above description that the use of such an interruptible state machine 200 can substantially simplify the implementation of a controller 102 (FIG. 6). It is noted that the interruptible state machine can have any number of normal states and can be adapted for more than one input or interrupt. For example, a standard state machine having 85 total states (17 normal states and 68 additional states for 4 inputs or interrupts) can be replaced with an interruptible state machine having 21 total states (17 normal states and 4 additional states for 4 inputs or interrupts). Note that the interruptible state machine can have more or fewer normal states and/or more or fewer additional states within the scope of the present invention.

Figure 14:
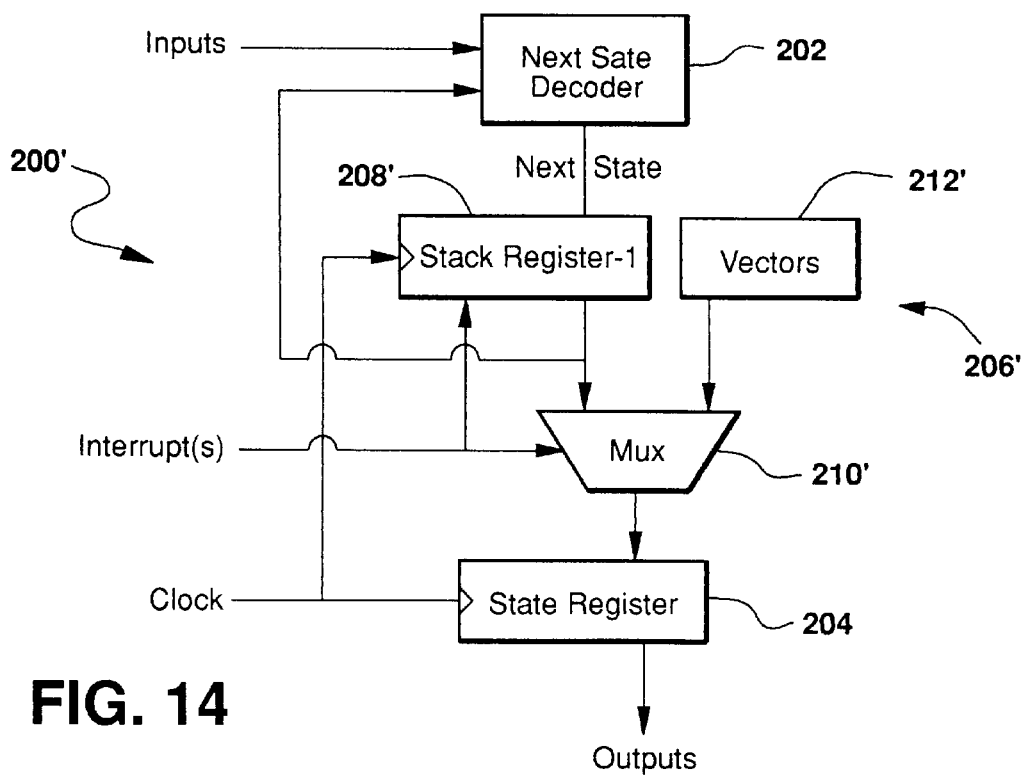
FIG. 14 is a block diagram of another embodiment of an interruptible state machine.

FIG. 14 illustrates an alternate embodiment of an interruptible state machine 200' according to the invention. The alternate machine 200' is possible in the case where the interrupts each last for only one clock cycle and where the output of the machine 200' is a pipelined data path. The alternative machine 200' is similar to the machine 200 of FIG. 13 except that a sequential register is utilized to assign outputs rather than a parallel register.

The interrupt processor 206' may include a sequential or primary state register 208', a secondary state register 204' a multiplexor 210', and one or more interrupt vectors 212'. The primary state register 208' communicates, and preferably directly connects, the next state decoder 202 with the multiplexor 210'. The multiplexor 210' communicates, and preferably directly connects, the primary state register 208' with the secondary state register 204'. The interrupt vectors 212' are in communication with, and preferably directly connected to, the multiplexor 210'.

When no interrupt (e.g., an embedded command) is active, the primary state register 208' is loaded with the next state information from the next state decoder 202. The contents of the primary state register 208' may then be transferred to the secondary state register 204' on a subsequent clock cycle, preferably the next or immediately following clock cycle. When an interrupt occurs, an enable is removed from the primary state register 208' which effectively places it into a hold state to store the next state information. The same interrupt controls the multiplexor' 210 to load a state vector, which is assigned to the specific interrupt and corresponds to the desired output, into the secondary state register 204' from the interrupt vectors 212. Thereafter, when the interrupt routine completes, the multiplexor 210' loads the original next state into the secondary state register 204' from the primary state register 208' where the next state was stored at the interruption. Therefore, the machine 200 resumes where it left off before the interruption. It is noted that the secondary state register 204' determines the output of the machine and the primary register 208' is used for both accumulation of the next state and storage of the next state.

It is noted that the interruptible state machines according to the present invention can solve complexity problems in other state machine environments such as, for example, pipelined data paths (including RISC processors) and dataflow architecture state machines or processors.

The processes of the present invention (e.g., as set forth in FIGS. 5, 8, and 12), the functions performed by the present state machine (e.g., as shown in FIGS. 3 and 4), and the functions of the present data mover (e.g., as shown in FIG. 6) may be implemented using a conventional general purpose digital computer programmed according to the teachings of the present specification, as will be apparent to those skilled in the relevant art(s). Appropriate software coding can be readily prepared by skilled programmers based on the teachings of the present disclosure, as will be apparent to those skilled in the relevant art(s).

The present invention may also be implemented by the preparation of ASICs, FPGAs, or by interconnecting an appropriate network of conventional component circuits, as is apparent to those skilled in the art(s).

The present invention thus also includes a computer product which may be a storage medium including instructions which can be used to program a computer to perform a process in accordance with the present invention. The storage medium can include, but is not limited to, any type of disk including floppy disk, optical disk, CD-ROMs, and magneto-optical disks, ROMs, RAMS, EPROMs, flash memory, magnetic or optical cards, or any type of media suitable for storing electronic instructions.

While particular embodiments of the present invention have been illustrated and described, it will be appreciated that numerous changes and modifications will occur to those skilled in the art, and it is intended that the appended claims cover all those changes and modifications which fall within the spirit and scope of the present invention.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. A method for transmitting a data packet and command, comprising the steps of:

(a) transmitting characters of a first data packet until at least one command having at least one differentiation character distinct from the characters of said first data packet is recognized, wherein said command occurs at any character boundary within said first data packet;

(b) transmitting said command; and (c) transmitting any remaining characters of the first data packet.

2. The method according to claim 1, wherein said command is independently selected from the group consisting of a data packet acknowledgement, a data packet negative acknowledgement, a command to provide information about a link, a command to enter a diagnostic mode, and a command to exit a diagnostic mode.

3. A method according to claim 1, wherein each command further includes from zero to N additional data and/or differentiation characters, where N is a positive integer.

4. The method according to claim 1, further comprising the step of suspending transmission of the characters of the first data packet when transmitting the at least one command.

5. The method according to claim 1, wherein said data packet has a plurality of packet characters, and a first number of packet characters are transmitted in step (a), a second number of differentiation characters are transmitted in step (b), and a third number of packet characters are transmitted in step (c).

6. The method of claim 5, wherein said third number is at least one.

7. The method according to claim 1, wherein said command further comprises one differentiation character.

8. The method according to claim 1, further comprising the steps of:

receiving characters of the first data packet until the first distinct differentiation character is recognized;

receiving the at least one command; and receiving any remaining characters of said first data packet.

9. The method according to claim 8, further comprising the step of suspending reception of the characters of the first data packet when receiving the at least one command.

10. The method according to claim 1, wherein said command is independently selected from the group consisting of a data packet acknowledgement, a packet negative acknowledgment, a data packet negative acknowledgement, a command to provide information about a link, a transmission on command, a transmission off command, a synchronize command, a fill command, a remote reset command, a command to enter a diagnostic mode, a command to exit a diagnostic mode, a remote loopback command, a disable remote loopback command, a remote built-in-self test on command, and a remote build-in-self test off command.

11. The method according to claim 1, wherein said command comprises a validation response.

12. A method for receiving a data packet and command, comprising the steps of:
   (a) receiving characters of a first data packet until said command having at least one differentiation character distinct from the characters of said first data packet is recognized, wherein said command occurs at any character boundary within said first data packet;
   (b) receiving said command; and
   (c) receiving any remaining characters of said first data packet.

13. The method according to claim 12, wherein said command is independently selected from the group consisting of a data packet acknowledgement, a data packet negative acknowledgement, a command to provide information about a link, a command to enter a diagnostic mode, and a command to exit a diagnostic mode.

14. The method according to claim 12, wherein said command further includes from zero to N additional data and/or differentiation characters, where N is a positive integer.

15. The method according to claim 12, further comprising the step of suspending reception of the characters of the first data packet when receiving the at least one command.

16. The method according to claim 12, wherein said data packets each have a plurality of packet characters, and a first number of packet characters are received in step (a), a second number of differentiation characters are received in step (b), and a third number of packet characters are received in step (c).

17. The method of claim 16, wherein said third number is at least one.

18. The method according to claim 12, wherein said command further comprises one differentiation character.

19. The method according to claim 12, further comprising the steps of:
   transmitting the characters of the first data packet until the first differentiation character is recognized;
   transmitting the command; and
   transmitting any remaining characters of the first data packet.

20. The method according to claim 19, further comprising the step of suspending transmission of the characters of the first data packet when transmitting the command.

21. The method according to claim 12, wherein said command is independently selected from the group consisting of a data packet acknowledgement, a packet negative acknowledgment, a data packet negative acknowledgement, a command to provide information about a link, a transmission on command, a transmission off command, a synchronize command, a fill command, a remote reset command, a command to enter a diagnostic mode, a command to exit a diagnostic mode, a remote loopback command, a disable remote loopback command, a remote built-in-self test on command, and a remote build-in-self test off command.

22. The method according to claim 12, wherein said command comprises a validation response.

23. An apparatus for transmitting data packets and commands, comprising:
   a memory configured to store data characters of a data packet;
   a transmitter configured to transmit said data characters of said data packet as packet characters; and
   a controller configured to (i) interrupt transmission of said packet characters of said data packet by said transmitter, (ii) enable transmission of a command having at least one differentiation character distinct from the data characters of said data packet, wherein said command occurs at any character boundary within said data packet, then (iii) resume transmission of any remaining packet characters in said data packet by said transmitter.

24. The apparatus of claim 23, wherein said remaining packet characters comprise at least one packet character.

25. The apparatus according to claim 23, wherein said differentiation character is independently selected from the group consisting of a data packet acknowledgement, a data packet negative acknowledgement, a command to provide information about a link, a command to enter a diagnostic mode, and a command to exit a diagnostic mode.

26. The apparatus according to claim 23, wherein said differentiation character is independently selected from the group consisting of a data packet acknowledgement, a packet negative acknowledgment, a data packet negative acknowledgement, a command to provide information about a link, a transmission on command, a transmission off command, a synchronize command, a fill command, a remote reset command, a command to enter a diagnostic mode, a command to exit a diagnostic mode, a remote loopback command, a disable remote loopback command, a remote built-in-self test on command, and a remote build-in-self test off command.

27. The apparatus according to claim 23, wherein said differentiation character comprises a validation response.

28. An apparatus for receiving data packets and commands, comprising:
   a memory configured to store data characters of a data packet;
   a receiver configured to receive packet characters of said data packet; and
   a controller configured to (i) interrupt reception of said data characters of said data packet by said receiver, (ii) enable reception of a command having at least one differentiation character distinct from the data characters of said data packet, wherein said command occurs at any character boundary within said data packet, then (iii) resume reception of any remaining packet characters in said data packet by said receiver.

29. The apparatus of claim 28, wherein said remaining packet characters comprise at least one packet character.

30. The apparatus according to claim 28, wherein said differentiation character is independently selected from the group consisting of a data packet acknowledgement, a data packet negative acknowledgement, a command to provide information about a link, a command to enter a diagnostic mode, and a command to exit a diagnostic mode.

31. The apparatus according to claim 28, wherein said differentiation character is independently selected from the group consisting of a data packet acknowledgement, a packet negative acknowledgment, a data packet negative acknowledgement, a command to provide information about a link, a transmission on command, a transmission off command, a synchronize command, a fill command, a remote reset command, a command to enter a diagnostic mode, a command to exit a diagnostic mode, a remote loopback command, a disable remote loopback command, a remote built-in-self test on command, and a remote build-in-self test off command.

32. The apparatus according to claim 28, wherein said differentiation character comprises a validation response.

* * * * *